Patented Sept. 26, 1944

2,359,126

UNITED STATES PATENT OFFICE 2,359,126

PROCESS OF OBTAINING PURIFIED FLAVANONE GLUCOSIDES

Carl Ludwig Lautenschläger and Fritz Lindner, Frankfort-on-the-Main, Adolf Mager, Niedernhausen in Taunus, and Erich Bartholomäus, Wiesbaden, Germany, assignors to Winthrop Chemical Company, Inc., New York, N. Y., a corporation of New York No Drawing. Application April 23, 1941, Serial No. 389,953. In Germany May 7, 1940

8 Claims. (Cl. 260—210)

The present invention relates to a process of obtaining purified flavanone glucosides.

The flavanone glucosides of the citrus fruits which are known under the name of "citrin" have properties which favorably influence the pathologic fragility and permeability of the capillary blood-vessels. (Rusznyák and A. Szent-Györgyi, Armentano, Bentsáth and Béres, Deutsche Medizinische Wochenschrift (1936), S, page 1325.)

According to the processes of manufacture hitherto known (A. Szent-Györgyi, Zeitschrift für physiologische Chemie (1938) vol. 255, page 126) alcoholic extracts of fruit peels are successively purified by means of lead acetate, barium acetate or other auxiliary agents. This method is very complicated and carrying it out on an industrial scale involves great difficulties.

Now, we have found that the "citrin" may be obtained simply with a good yield on a technical scale and in a pure state by subjecting citrus fruits or alcoholic extracts therefrom, especially methlalcoholic extracts, after removal of the alcohol, to a fractional extraction with several organic solvents which dissolve, on the one hand, the ballast substances and, on the other hand, the "citrin." Comparative experiments have shown that aliphatic esters of at most 5 carbon atoms such as methyl formate and ethyl formate, methylacetate, ethylacetate, principally dissolve the "citrin" whereas aliphatic esters of higher molecular weight containing at least 6 carbon atoms as well as simple aromatic esters whose boiling points do not essentially exceed 200° C., such as methyl benzoate and the homologues and analogues thereof, mainly dissolve the ballast substances.

For instance, the process may be carried out by extracting the alcoholic extract residues of citrus fruit peels several times with butylacetate or with methyl benzoate in order to remove the by-products and subsequently treating the nonabsorbed mass with ethyl acetate in order to obtain pure citrin. With similar success the process may be carried out vice versa by first extracting the material, in this case the residue obtained by evaporating the alcoholic extract, with an organic solvent of the kind described which mainly dissolves the "citrin," that is to say with the esters of low molecular weight, and subsequently purifying the crude "citrin" thus obtained which still contains a small amount of by-products by extracting it with the other class of solvents mentioned above, that is to say, with the esters of higher molecular weight. Since, owing to the loss of water, the mass to be extracted frequently thickens, it is advantageous to saturate the solvents, before use, with water or, from time to time, to add some water to the batch while extracting it.

With similar success fresh or dried fruit peels may be used instead of alcoholic extracts.

The following examples serve to illustrate the invention but they are not intended to limit it thereto:

(1) Lemon peels are exhaustively extracted with methanol. The alcohol is then expelled from this extract. 100 grams of the residue thus obtained having a colorimetrically determinable content of 4500 mgs. of citrin are extracted several times on the steam bath using 300 cc. of butyl acetate each time, while vigorously stirring.

The extract which mainly contains ballast substances is discarded. In order to obtain the citrin, the citrin-containing residue thus purified is repeatedly extracted with ethyl formate. After evaporating the ester, the remaining residue is taken up in water. The aqueous solution contains:

| Citrin | Dry residue | Degree of purity citrin–dry residue |
|---|---|---|
| Mgs. 3,625 | Mgs. 6,098 | 1:2 |

(2) 1000 grams of fresh lemon peels are passed through a meat-chopping machine and the comminuted material is repeatedly extracted using 3000 cc. of methyl acetate each time. The extracts are combined and the methyl acetate removed under reduced pressure. The sirupy residue is dissolved in about one-half (½) liter of hot water. Any precipitate which forms is separated by filtration and the contents of citrin in the filtrate and in the solid residue are determined.

Yield of crude citrin: 2625 mgs.; dry residue: 188 mgs./1 cc.; degree of purity: citrin: dry residue=1:7.5.

The crude citrin solution is then evaporated until it shows a sirupy consistency and then freed from ballast substances by extracting it 5 times using 300 cc. of butyl acetate each time. After the last extraction the butyl acetate is sharply decanted and the residues of the solvent are removed under reduced pressure.

The residue is taken up in 100 cc. of water and brought to a pH-value of 5.8; contents of citrin and dry residue are again determined.

1 cc. contains 25 mgs. of citrin and 84 mgs. of dry residue. Total yield: 2500 mgs. of citrin; degree of purity: 1:3.

The citrin solutions thus obtained are brown liquids. They mainly contain an isomorphous mixture of two flavanoneglycosides of hesperidin and eriodictyol. The hesperidin is difficultly soluble and crystallizes easily whereas the eriodictyol dissolves extremely easily but cannot be obtained in a crystalline state.

(3) Lemon peels are exhaustively extracted with methanol. The alcohol is expelled from this extract and 100 grams of the residue thus obtained which contain 4500 mgs. of citrin are extracted with ethyl acetate. The resulting extract contains mainly citrin together with some ballast substances. It is evaporated under reduced pressure until it shows a sirupy consistency and the resultant crude citrin is freed from admixed ballast substances by repeated extraction, while stirring on the steam bath, using 300 cc. of butyl acetate each time. The extract of butyl acetate which mainly contains the impurities is discarded. The residue thus purified is freed from butyl acetate under reduced pressure and dissolved in water.

The solution contains:

| Citrin | Dry residue | Degree of purity citrin: dry residue |
|---|---|---|
| Mgs. 3,324 | Mgs. 7,768 | 1:2.3 |

(4) Lemon peels are exhaustively extracted with methanol. The alcohol is expelled from this extract and 100 grams of the residue thus obtained which contain 4500 mgs. of citrin are repeatedly extracted by stirring each time with 300 cc. of methyl benzoate on the steam bath in order to eliminate the ballast substances. The extracts principally contain the impurities and are discarded. For the purpose of obtaining the citrin, the residue is repeatedly extracted with ethyl formate. The ester is evaporated from the extract under reduced pressure and the remaining residue is dissolved in water.

The solution contains:

| Citrin | Dry residue | Degree of purity citrin: dry residue |
|---|---|---|
| Mgs. 3,500 | Mgs. 7,408 | 1:2.1 |

We claim:

1. A process of obtaining purified flavanone glucosides which comprises separately extracting material containing such glucosides with an aliphatic carboxylic acid ester containing not more than five carbon atoms and with a carboxylic acid ester containing at least six carbon atoms and having a boiling point not substantially exceeding 200° C.

2. A process of obtaining purified flavanone glucosides which comprises extracting a substance containing flavanone glucosides with an aliphatic carboxylic acid ester containing not more than 5 carbon atoms and eliminating by-products by extracting with a carboxylic acid ester containing at least 6 carbon atoms and having a boiling point not substantially exceeding 200° C.

3. A process of obtaining purified flavanone glucosides which comprises extracting a substance containing flavanone glucosides with ethyl acetate and then eliminating by-products from this extract by extraction with butyl acetate.

4. A process of obtaining purified flavanone glucosides which comprises first extracting an evaporated residue of an alcoholic extract of citrus fruit material with butyl acetate and then extracting the remaining residue with ethyl formate.

5. A process of obtaining purified flavanone glucosides which comprises first extracting an evaporated residue of an alcoholic extract of citrus fruit material with methyl benzoate and then extracting the remaining residue with ethyl formate.

6. A process of obtaining purified flavanone glucosides which comprises first extracting an evaporated residue of an alcoholic extract of citrus fruit material with ethyl acetate and then eliminating by-products from this extract by extraction with butyl acetate.

7. In a process of obtaining citrin the steps which comprise preparing an alcoholic citrus fruit extract, de-alcoholizing the same to form an extract residue and then treating the extract residue with butyl acetate to remove from such residue those components which are soluble in butyl acetate.

8. A process of obtaining citrin which comprises the steps of treating an alcoholic extract of citrin-containing materials, from which alcohol has been removed, with butyl acetate to remove from such extract those components which are soluble in butyl acetate treating the undissolved residue with ethyl formate to form a citrin solution and recovering citrin from such solution.

CARL LUDWIG LAUTENSCHLÄGER.
FRITZ LINDNER.
ADOLF MAGER.
ERICH BARTHOLOMÄUS.